(12) United States Patent  (10) Patent No.: US 6,974,014 B2
Montanana  (45) Date of Patent: Dec. 13, 2005

(54) ROTARY COUPLING

(75) Inventor: Raul Montanana, Gloucestershire (GB)

(73) Assignee: SAMAR Systems Limited, Coleford (GB)

( * ) Notice: Subject to any disclaimer, the term of this patent is extended or adjusted under 35 U.S.C. 154(b) by 15 days.

(21) Appl. No.: 10/752,525

(22) Filed: Jan. 8, 2004

(65) Prior Publication Data

US 2004/0140171 A1    Jul. 22, 2004

(30) Foreign Application Priority Data

Jan. 14, 2003  (GB)  .................................... 0300758

(51) Int. Cl.⁷ ............................................ F16D 67/02
(52) U.S. Cl. ...................................... 192/223; 192/14
(58) Field of Search .......................... 192/223, 12 B, 192/14, 37, 43.1; 188/134

(56) References Cited

U.S. PATENT DOCUMENTS

| | | | |
|---|---|---|---|
| 2,350,627 A | 6/1944 | Malachowski | |
| 2,673,449 A * | 3/1954 | Roberts | ........................ 60/352 |
| 2,743,804 A * | 5/1956 | Roberts | ................... 192/48.91 |
| 6,405,818 B1 * | 6/2002 | Anthony et al. | ............ 180/65.8 |
| 2004/0182671 A1 * | 9/2004 | Montanana | ................... 192/71 |

FOREIGN PATENT DOCUMENTS

| | | |
|---|---|---|
| DE | 2031527 | 12/1971 |
| EP | 0 999 375 A1 | 5/2000 |
| EP | 1 152 163 A2 | 11/2001 |
| EP | 1 375 949 A1 | 1/2004 |
| GB | 131307 | 8/1919 |
| GB | 2 068 061 | 8/1981 |
| GB | 2 181 500 A | 4/1987 |

* cited by examiner

Primary Examiner—Richard M. Lorence
(74) Attorney, Agent, or Firm—Young & Thompson (57) ABSTRACT

A rotary coupling comprises a driving part, a drivable part, a fixed part in which the driving and drivable parts are each rotatable coaxially, and a set of coupling members carried by one of the driving and drivable parts for torque-transmitting engagement with the other. The coupling members are selectively positionably arranged so that, in a first condition, the coupling members are juxtaposed to a primary annular contact surface of either the fixed part or the drivable part and, in a second condition, the coupling members are juxtaposed to a secondary annular contact surface of the driving part. Each coupling member is free to move relative to the driving and drivable parts into and out of engagement with the primary and secondary annular contact surfaces. The arrangement is such that, when the coupling members are in the first condition, the application of a first torque on the coupling members causes the coupling members to engage the primary annular contact surface and, when the coupling members are in the second condition, the application of a second torque on the coupling members causes the coupling members to engage the secondary annular contact surface.

19 Claims, 7 Drawing Sheets

ROTARY COUPLING

This invention relates to a rotary coupling having selectively positionable coupling members.

BACKGROUND OF THE INVENTION

Rotary couplings are known, such as from GB 2343923 which utilises coupling members carried by a driving part and seated in recesses on a driven part. A driving torque can thus be transmitted from the driving part to the driven part through the coupling members, but the application of a reverse torque, i.e. where a torque is applied externally to the driven part of the coupling causing the driven part to attempt to drive the driving part, such as in a runaway condition, causes the coupling members to move or tilt relative to their recesses, thereby engaging a fixed braking surface on the rotary coupling and locking it up.

However, there are times when it is necessary to be able to allow transmission of a reverse torque. For example, it is a requirement that motorised wheel-chairs be capable of having a free-wheel state, i.e. where the application of a reverse torque is permitted without locking the rotary coupling, as well as a motor-driven state. Obviously, use of the above-mentioned known rotary coupling prevents the wheel-chair ever assuming a dangerous runaway condition, but also fails to provide for the required free-wheel state.

A further problem is apparent in battery operated drive systems, for example in stairlifts, where it is a requirement to have a battery-operated emergency back-up system, and in electric vehicles, such as golf carts. These drive systems commonly utilise worm-drive gearbox arrangements due to their inherent ability to prevent or inhibit the transmission of reverse torque (i.e. back-driving). However, it is well-known that worm-drive gearbox arrangements are extremely inefficient, generally in the order of 70%. As a consequence, bigger or more battery packs are required to enable longer running times, which itself leads to increased weight and reduced space problems.

It is known that reduction-type gearbox arrangements are far more efficient than worm-drive gearbox arrangements. However, reduction gearbox arrangements have a much reduced ability to inhibit back-driving, and are thus generally not preferred.

Yet another problem is apparent in clutch arrangements. Friction-plate clutch arrangements are in common-use, but the plates tend to wear causing unreliable torque transmission.

The present invention seeks to overcome these problems.

SUMMARY OF THE INVENTION

A rotary coupling comprising a driving part; a drivable part; a fixed part in which the driving and drivable parts are each rotatable coaxially; and a set of coupling members carried by one of the driving and drivable parts for torque-transmitting engagement with the other, wherein the coupling members are selectively positionably arranged so that, in a first condition, the coupling members are juxtaposed to a primary annular contact surface of one of the fixed part and the drivable part and, in a second condition, the coupling members are juxtaposed to a secondary annular contact surface of the driving part; wherein each coupling member is free to move relative to the driving and drivable parts into and out of engagement with the primary and secondary annular contact surfaces; and wherein said arrangement is such that, when the coupling members are in said first condition, application of a first torque on the coupling members causes the coupling members to engage the primary annular contact surface and, when the coupling members are in the second condition, application of a second torque on the coupling members causes the coupling members to engage the secondary annular contact surface.

The present invention will now be described, by way of example, with reference to the accompanying drawings.

DETAILED DESCRIPTION OF THE PREFERRED EMBODIMENTS

Referring firstly to FIGS. 1 to 5 of the drawings, there is shown a rotary coupling 10 adapted for use as part of a wheel-chair. The rotary coupling 10 comprises a driving part 12, a drivable part 14 and a fixed part 16. The driving part 12 and the drivable part 14 are mounted to be rotatable coaxially within the fixed part 16. The fixed part 16 is a body having an external fastening flange 18 for attachment to a suitable chassis 20 and a stepped cylindrical bore 22 forming an interior shoulder 24. One end of the body is closed by a first end housing 26, and the other by a second end housing 28. The body of the fixed part 16 and its two end housings 26 and 28 are secured together by suitable fastening means, such as screw-threaded fasteners 30.

Figures 1, 4:
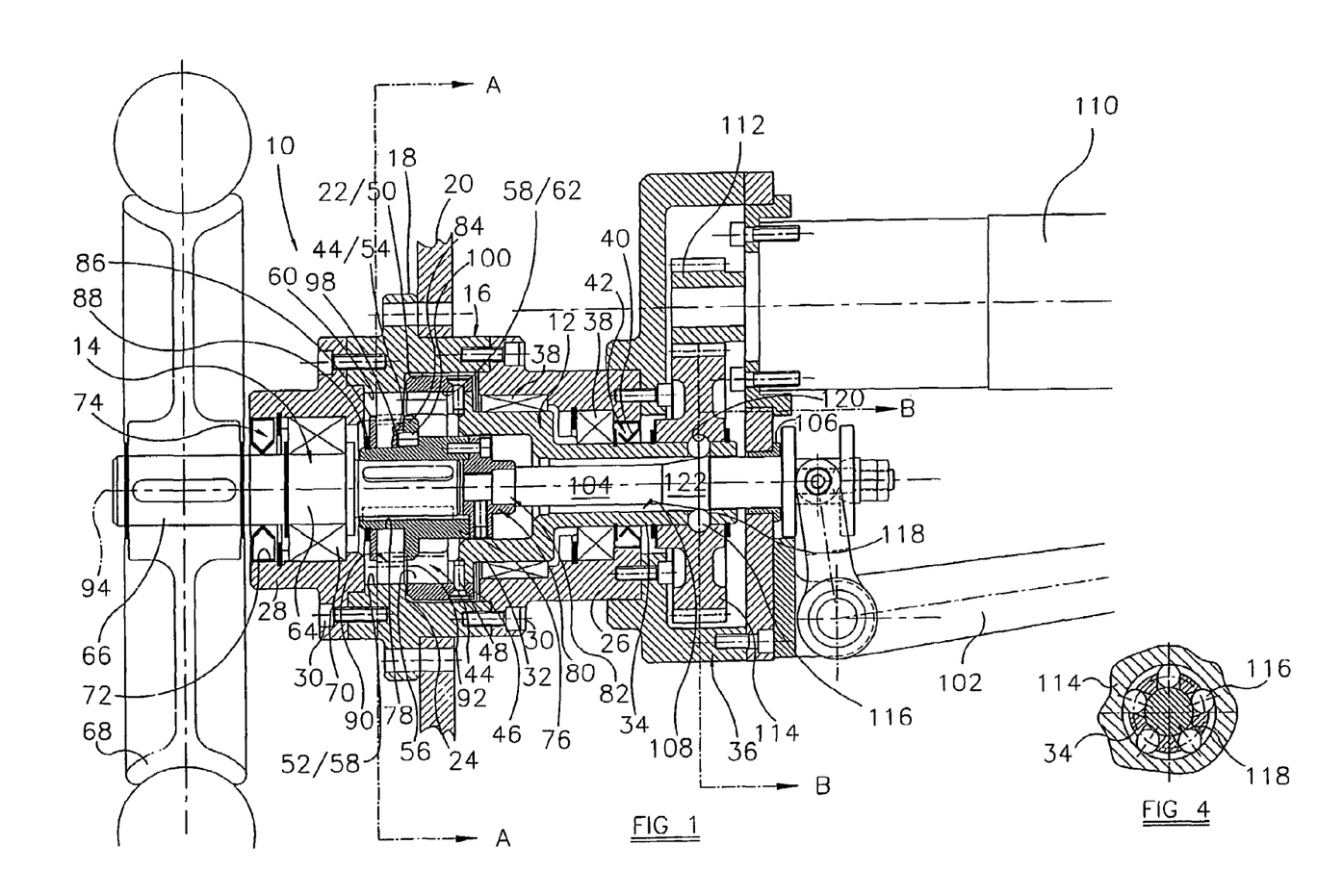
FIG. 1 is a partial longitudinal cross-section of a first embodiment of a rotary coupling, in a first condition and in accordance with the present invention.
FIG. 4 is a transverse sectional view taken along the line B—B in FIG. 1.

The driving part 12 of the coupling 10 comprises a hollow stepped driving shaft 32, or input shaft, having a projecting portion 34 which projects from the first end housing 26, coaxially with the fixed part body, and which is torque disengagably coupled to a reduction gearbox 36. The first end housing 26 includes bearings 38 positioned in spaced relationship, and a gasket 40 situated adjacent the opening 42 of the first end housing 26. The driving shaft 32 is directly supported by the bearings 38 and projects through the gasket 40, which provides a fluid-tight seal around the outer circumference of the driving shaft 32.

The driving part 12 is completed by a carrier 44, which projects from the end of the driving shaft 32 opposite the projecting portion 34, and an annular contact member 46 which is in the form of a coaxial ring concentrically arranged with and around the carrier 44 and fastened to the driving shaft 32 using screw-threaded fasteners 48. The carrier 44 projects axially beyond the annular contact member 46, for reasons which will become apparent hereinafter. The annular contact member 46 is positioned in the larger diameter portion 50 of the stepped bore 22, directly adjacent to the interior shoulder 24 of the fixed part 16, and has an interior diameter equal, or substantially equal, to the smaller diameter portion 52 of the stepped bore 22 of the fixed part 16.

The carrier 44 takes the form of an integral annular ring which is coaxial with the driving shaft 32 and which is interrupted by a number of axially elongate U-shaped (when viewed in plan) seatings 54, each having two generally opposed arcuate thrust surfaces 56. The outer perimeter of the carrier 44 lies radially inside the annular contact member 46 of the driving part 12 and the smaller diameter portion 52 of the axial stepped bore 22 of the body of the fixed part 16. The interior surface 58 of the smaller diameter portion 52 of the fixed part 16 constitutes a primary annular contact surface, or braking surface 60, and the interior surface 58 of the annular contact member 46 constitutes a secondary annular contact surface 62. The U-shaped seatings 54 are sufficiently elongate to lie in transverse planes containing the primary braking surface 60 of the fixed part 16 and the secondary annular contact surface 62 of the driving part 12.

The drivable part 14 comprises a drivable shaft 64, or output shaft, having a projecting portion 66 on which a ground engaging wheel 68 is received, the wheel 68 being angularly fixed relative to the drivable shaft 64. The drivable shaft 64 extends through the second end housing 28 and coaxially with the cylindrical body of the fixed part 16 and the driving shaft 32 of the driving part 12. The second end housing 28, similarly to the first end housing 26, includes a bearing 70 and a gasket 72 situated adjacent the opening 74 of the second end housing 28. The drivable shaft 64 is directly supported by the bearing 70 and projects through the gasket 72, which provides a fluid-tight seal around the circumference of the drivable shaft 64.

Figure 3:
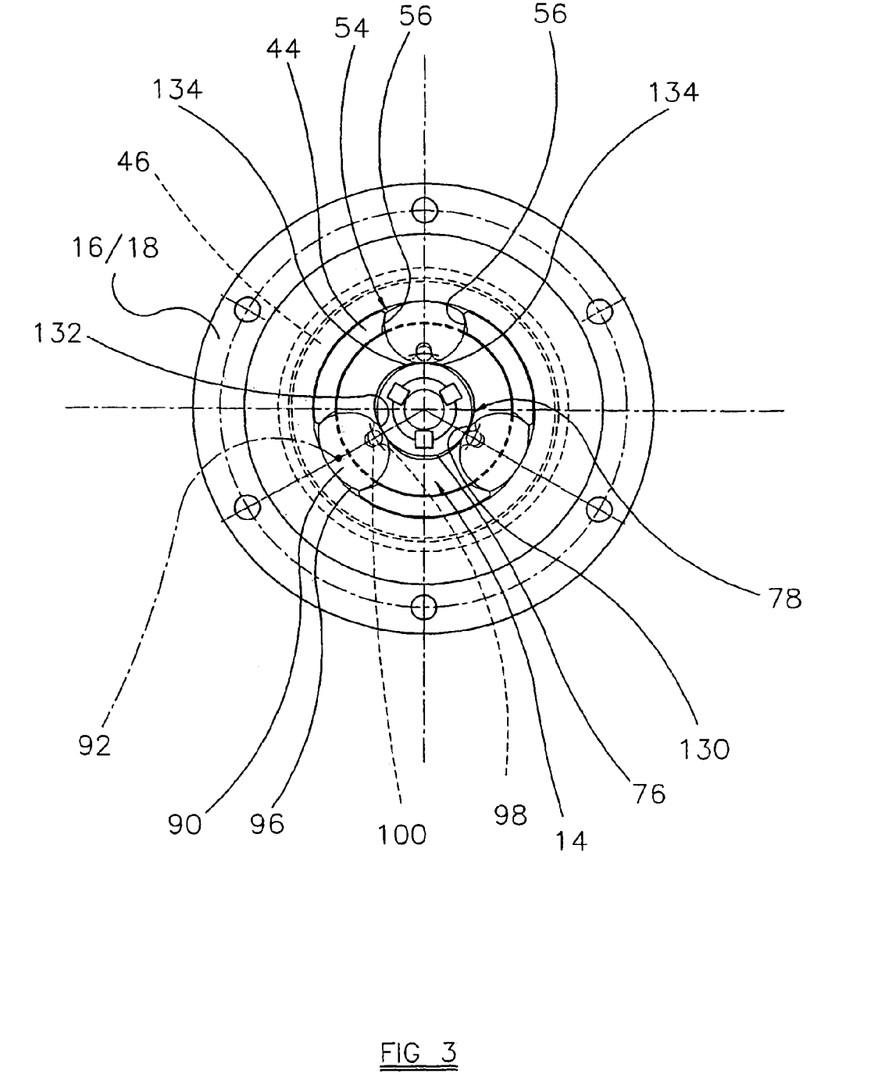
FIG. 3 is a transverse sectional view taken along the line A—A in FIG. 1.
Figure 5:
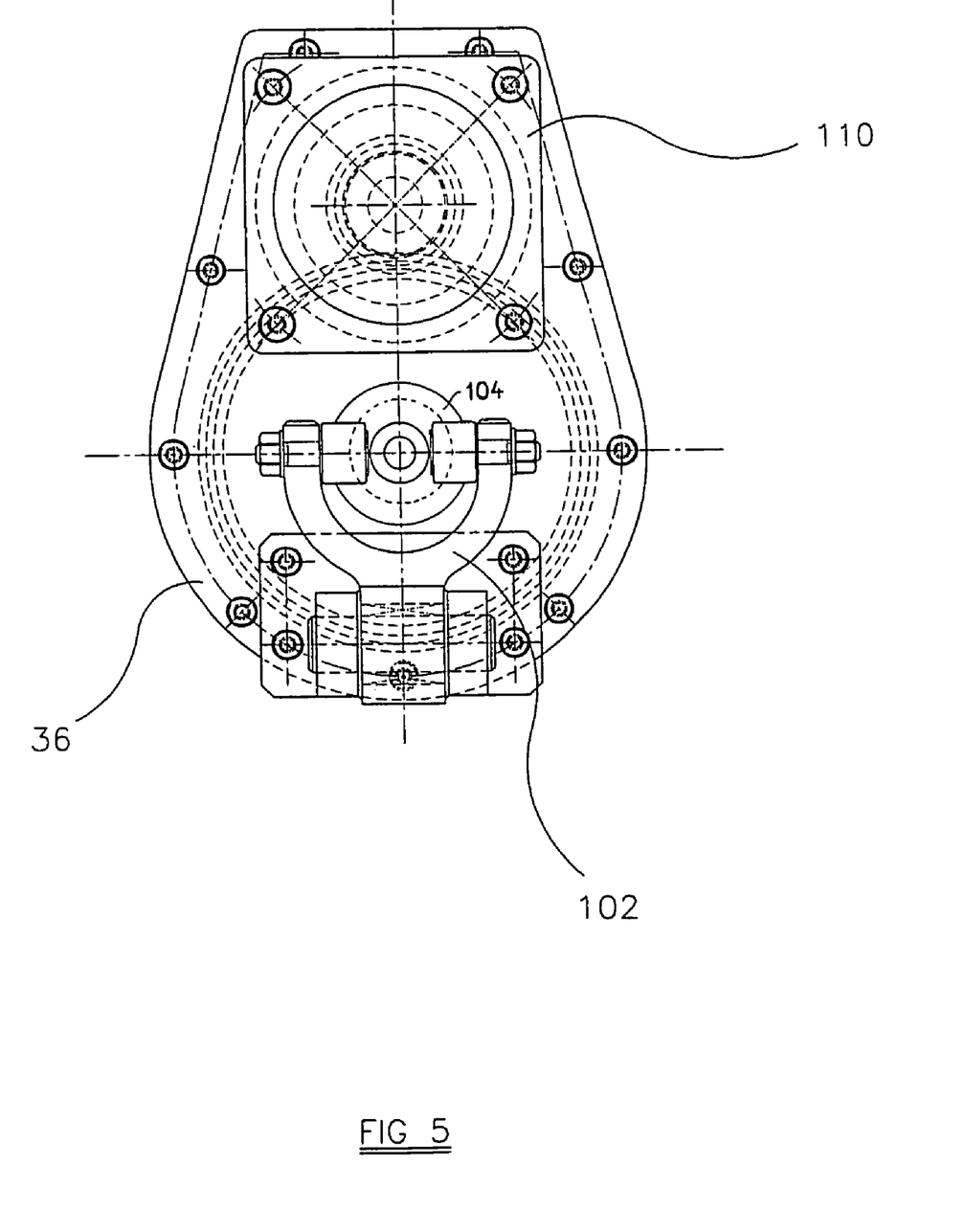
FIG. 5 is an elevational view of the right-hand end of the rotary coupling shown in FIG. 1.

The drivable part 14 further comprises a collar 76 which is coaxially aligned with the driving and drivable shafts 32 and 64 and which is keyed to the end of the drivable shaft 64 positioned within the fixed part 16. The carrier 44 surrounds the collar 76, and the collar 76 includes shallow curved, or concave, recesses 78 which are open towards the corresponding U-shaped seatings 54 of the carrier 44. As best seen in FIG. 3, the concave recesses 78, when viewed in transverse cross-section, have a part-sinusoidal shape.

The keying of the collar 76 to the drivable shaft 64 prevents angular displacement of the collar 76 relative to the drivable shaft 64, but allows the collar 76 to slide axially along the drivable shaft 64 to a first position where the concave recesses 78 lie in, or substantially in, the same transverse plane as the primary braking surface 60 of the fixed part 16, and to a second position where the concave recesses 78 lie in, or substantially in, the same transverse plane as the secondary annular contact surface 62.

An end-cap 80 is screw-threadably fastened to one end of the collar 76 to form a receptacle in which the end of the drivable part 14 can slide. The end-cap 80 includes a screw-threaded opening 82 coaxially aligned with the rotational axes of the driving and drivable parts 12 and 14.

The collar 76 is integrally formed with a circumferentially extending shoulder 84 which borders the sides of the concave recesses 78 closest to the end-cap 80. A separate retaining ring 86, held in place by a retaining clip 88 engaged with the collar 76, borders the other side of the concave recesses 78.

The stepped bore of the hollow driving shaft 32, adjacent the carrier 44, is dimensioned, to enable the collar 76 to be slidably receivable, along the rotational axis 94 of the rotary coupling 10, in the hollow driving shaft 32 to the said first position and the said second position. At the first position, the end-cap 80 abuts, or substantially abuts, the end face of the drivable shaft 64; and in the second position, the collar 76 shoulder abuts, or substantially abuts, the end face of the driving shaft 32.

The driving and drivable parts 12 and 14 are coupled together be means of a set of independent coupling members 90. These are arranged in a planetary array around the collar 76, seated in the concave recesses 78 and limited in axial movement, relative to the collar 76, by the collar shoulder 84 on one side and the retaining ring 86 on the other. Each coupling member 90 projects radially from its concave recess 78 and is received in a respective one of the said elongate U-shaped seatings 54 of the carrier 44.

Each coupling member 90 is in the form of a truncated cylinder (see FIG. 3) with a cylinder axis 92 parallel to the rotational axis 94 of the rotary coupling 10. The truncation of the cylinder defines a wedging surface 96 which faces radially outwards. Each wedging surface 96 is of arcuate cross-section, with a slightly smaller radius than the primary braking surface 60 of the fixed part 16 and the secondary annular contact surface 62 of the driving part 12.

It should be noted that the cylinder axis 92 of each coupling member 90 lies on a pitch circle which is intermediate the inner and outer perimeters of the carrier 44.

Each coupling member 90 includes an opening 98 formed at its base symmetrically in the face facing the collar shoulder 84. In this case, the opening 98 is a recess, but it may equally be a through-hole. A pin element 100 projects, in parallel or substantially in parallel with the rotational axis 94 of the coupling 10, from the collar shoulder 84 and engages the coupling member 90 through the opening 98. The pin element 100 is a close fit in the coupling member opening 98, but is spaced from the surface of the concave recess 78.

A lever mechanism comprises a manual lever 102, pivotably mounted to an exterior surface of the reduction gearbox 36, and an elongate push-rod actuating element 104 coupled to the lever 102. The push-rod element 104 extends, via a fluid-tight gasket 106, through the reduction gearbox 36 and coaxially along the bore 108 of the hollow driving shaft 32. The end of the push-rod element 104, received in the rotary coupling 10, is screw-threadingly engaged with the screw-threaded opening 82 of the end-cap 80 fastened to the collar 76.

The input side of the reduction gearbox 36 is directly coupled to a suitable battery-operated motor 110, and the gearbox 36 has a pinion gear 112 and crown gear 114 arrangement. The pinion gear 112 is directly driven by the motor 110, and the crown gear 114 is coaxially mounted on the projecting end of the driving shaft 32 of the rotary coupling 10.

A known ball-bearing friction coupling arrangement is used to torque transmittingly engage and disengage the reduction gearbox 36 and the rotary coupling 10. This friction coupling includes a plurality of ball-bearings 116 (also see FIG. 4) seated in circumferentially spaced apertures 118 around the driving shaft 32, adjacent to its projecting end, and a groove 120 formed in the surface of the crown gear 114 in which the ball-bearings 116 can radially project. The push-rod element 104 of the lever mechanism includes a frusto-conical portion 122 which the ball-bearings 116 contact through the apertures 118 in the driving shaft 32. Consequently, when the push-rod element 104 is moved axially, the ball-bearings 116 move up the inclined surface of the frusto-conical portion 122 and are thus urged radially outwards into frictional, and therefore torque transmitting, engagement with the surface of the groove 120 of the crown gear 114.

Referring to FIG. 1, in normal operation, when it is required to prevent a runaway condition occurring, the lever 102 of the lever mechanism is operated to move the push-rod element 104 axially, causing the collar 76 to take up the first position so that the wedging surfaces 96 of the coupling members 90 are juxtaposed to the primary braking surface 60 of the fixed part 16. This axial movement of the push-rod element 104 also has the effect of torque engaging the driving shaft 32 with the crown gear 114 of the reduction gearbox 36.

In this case, when the motor 110 is operated, the reduction gearbox 36 drives the driving shaft 32 and torque is transmitted to the drivable shaft 64 through the appropriate thrust surfaces 56 (depending on the direction of rotation) of the U-shaped seatings 54 of the carrier 44 and the coupling members 90. The engagement between the thrust surfaces 56 and the coupling members 90 result in a generally tangential thrust in a radial zone (generally defined by the thrust surface 56), and this thrust is close to, and/or passes through, the cylinder axis 92 of each coupling member 90. As best seen in FIG. 3, the thrust surfaces 56 may be shaped to lie at an angle to the coupling members 90. This enables point contact between the thrust surfaces 56 and the respective coupling members 90. This point contact allows orientation of the thrust imparted by the thrust surfaces 56 to the coupling members 90 to be controlled and thus improve the performance of the rotary coupling 10.

The application of the said thrust causes the coupling members 90 to project radially inwards from the carrier 44 to engage, in another radial zone, the concave recesses 78 of the collar 76, thereby transmitting the torque to the drivable part 14 and rotating the wheel 68.

Referring to FIG. 3, the part-sinusoidal shape of each concave recess 78 is such that the base portion 130 of the recess 78 has a radius which matches, or substantially matches, the radius of the bottom surface 132 of the respective coupling member 90. The portions 134 of the surface of the recess 78 adjacent the base portion 132 present cam forms which, in this case, act to improve engagement of the coupling member 90 with the recess 78.

In a normal stationary configuration, i.e. when the reduction gearbox 36 is engaged but the motor 110 is not driving, each coupling member 90 lies in a generally radially symmetrical attitude in its U-shaped seating 54, and the wedging surfaces 96 of the coupling members 90 are out of contact with the braking surface 60 of the fixed part 16.

The pin element 100, acting in conjunction with the corresponding opening 98, helps the coupling member 90 retain its generally radially symmetrical attitude during normal operation of the rotary coupling 10.

If a net reverse torque is applied (for example, in a runaway condition) externally to the drivable part 14 of the rotary coupling 10 through the wheel 68, this reverse torque is transmitted to the coupling members 90 through the concave recesses 78 of the collar 76. The radial engagement zone of the coupling members 90 with the drivable part 14 is substantially further from the cylinder axis 92 than the radial zone in which the forward thrust is applied by the thrust surface 56 in the normal driving mode. A turning moment is therefore applied to the coupling members 90 by the concave recesses 78. As the coupling members 90 move in a circumferential direction along the base portion 130 and the cam-form surface portions 134, this induces movement about the cylinder axes 92, which are therefore moment axes, and the coupling members 90 ride up one or other thrust surface 56 (depending on the direction of rotation of the coupling) towards the braking surface 60 of the fixed part 16.

The pin element 100 in conjunction with the opening 98 aid in providing a positive and progressive movement and rotation of the coupling member 90 along the base portion 130 and the cam-form surface portions 134. As each coupling member 90 continues to rotate and ride up one cam-form surface portion 134 of its recess 78, the wedging surface 96 progressively contacts, and is thus forced into progressive wedging engagement, with the braking surface 60. The rotary coupling 10 is therefore progressively locked up, preventing the reverse torque from passing to the driving part 12 and preventing the wheel 68 from turning.

Figure 2:
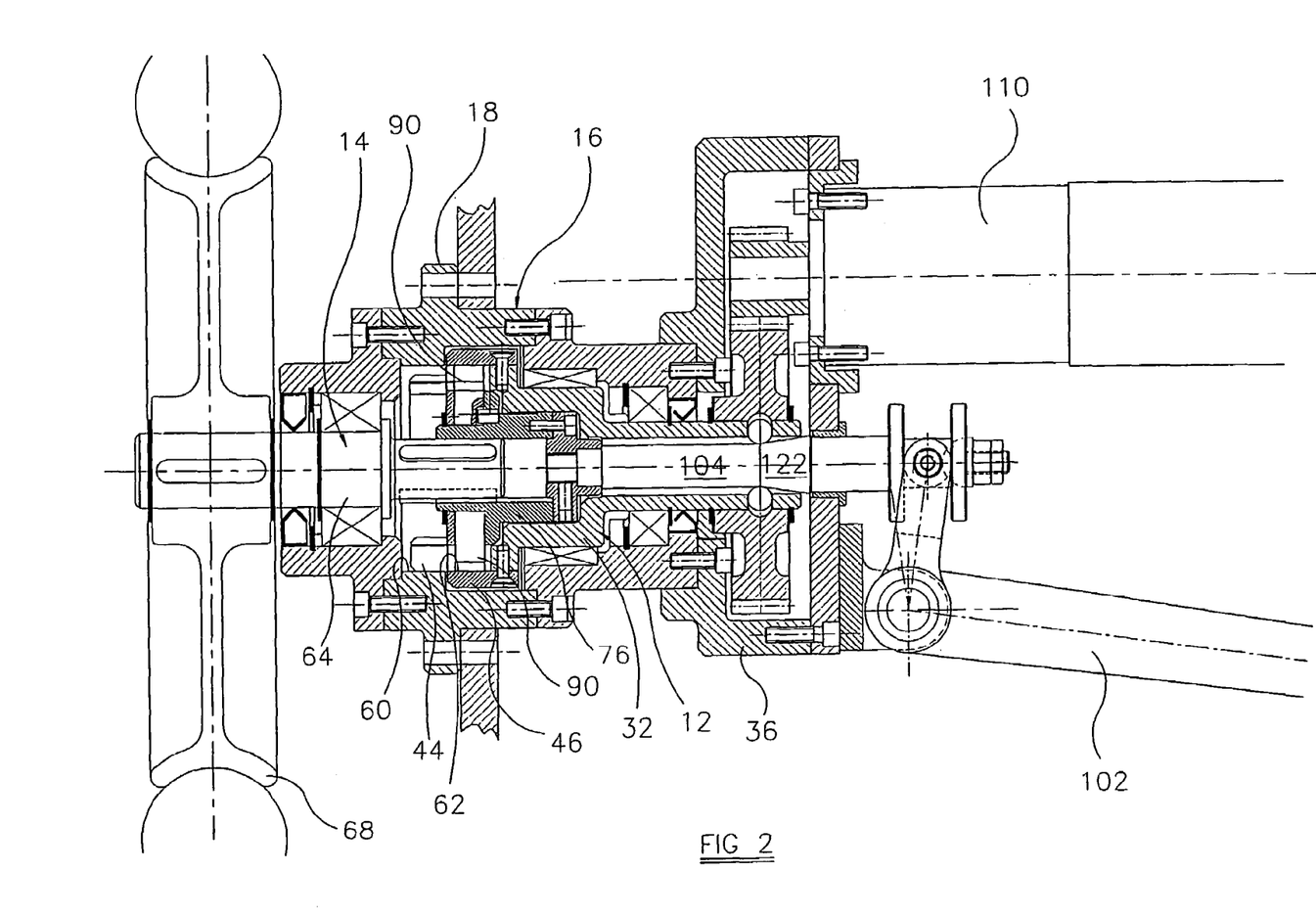
FIG. 2 is a view similar to FIG. 1 of the rotary coupling, but in a second condition.

Referring to FIG. 2, when the wheel 68 is required to be in a free-wheel state, i.e. when the application of a reverse torque does not cause the rotary coupling 10 to lock up, the lever 102 is operated to move the push-rod element 104 axially in a reverse direction, causing the collar 76 to slide to the second position. This sliding movement results in the coupling members 90 sliding in their respective elongate U-shaped seatings 54 so that the wedging surfaces 96 are now juxtaposed to the secondary annular contact surface 62 of the driving part 12. This axial movement of the push-rod element 104 also has the effect of torque disengaging the driving shaft 32 and the crown gear 114.

The wheel 68 can now freely rotate in either direction. Back-driving of the drivable shaft 64, i.e. applying a net reverse toque, as described above, causes a turning moment to be imparted to the coupling members 90, whereby the coupling members 90 ride up the base and cam-form surface portions 130 and 134 of the concave recesses 78 and the appropriate thrust surfaces 56 of the U-shaped seatings 54 of the carrier 44 into progressive wedging engagement with the secondary annular contact surface 62 of the driving part 12. However, since the driving shaft 32 is torque disengaged from the reduction gearbox 36, any wedging engagement of the coupling members 90 with the secondary annular contact surface 62 simply causes the driving shaft 32 to rotate freely in the bearings 38.

Although a lever mechanism is used for selectively changing the rotary coupling 10 from the first condition in which the transmission of a reverse torque is prevented, to the second condition in which the transmission of a reverse torque is permitted, any suitable actuator mechanism could be utilised.

It is also possible to keep the reduction gearbox 36 in permanent torque transmitting engagement with the driving shaft 32, and simply not operate the motor 110 when the rotary coupling 10 is in the second free-wheel condition. However, in this case, the motor 110 would be back-driven, via the driving shaft 32 and the reduction gearbox 36, resulting in a degree of resistance to motion of the wheel 68.

Figure 6:
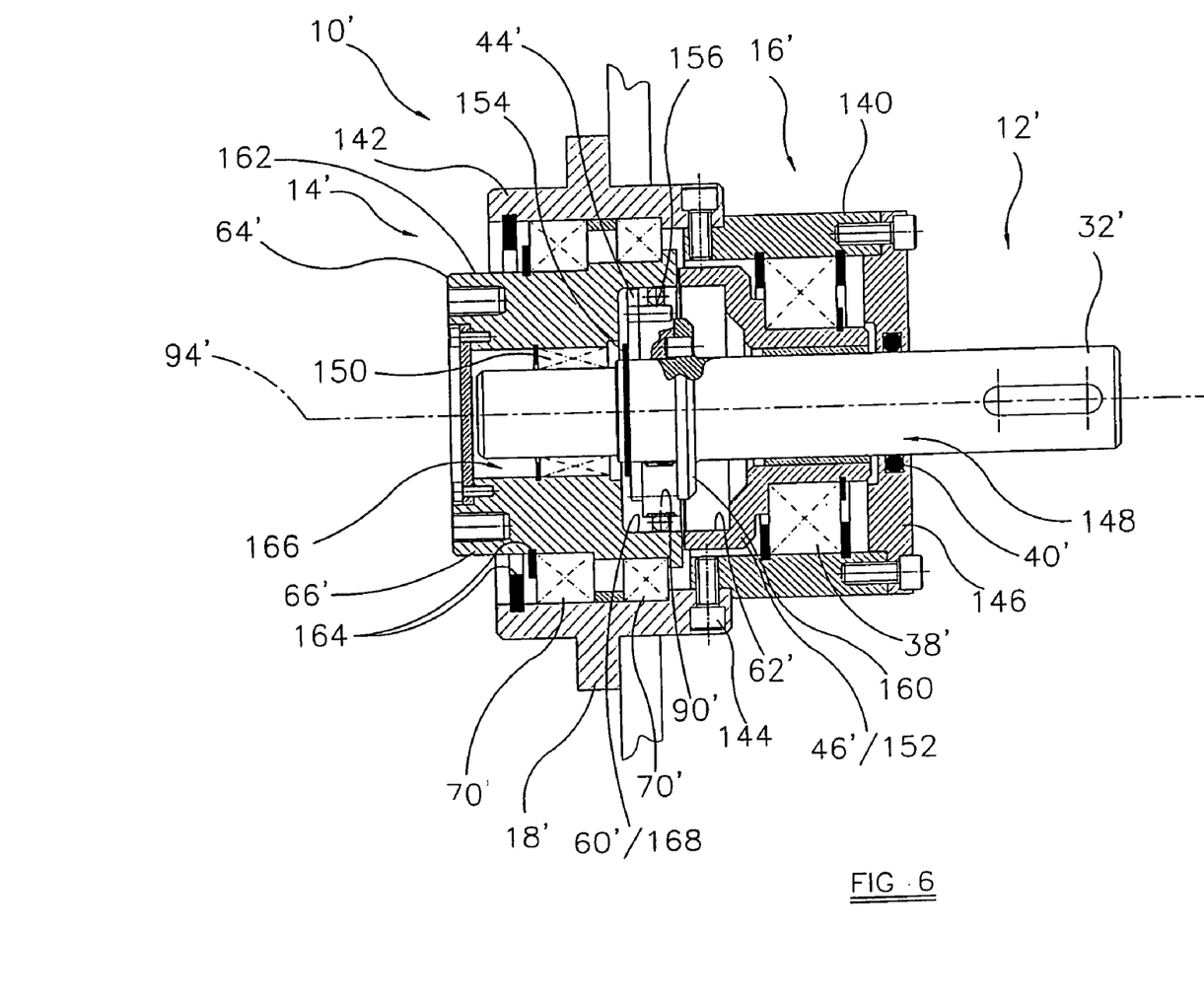
FIG. 6 is a partial longitudinal cross-section of a second embodiment of a rotary coupling, in a first condition and in accordance with the present invention.
Figure 7:
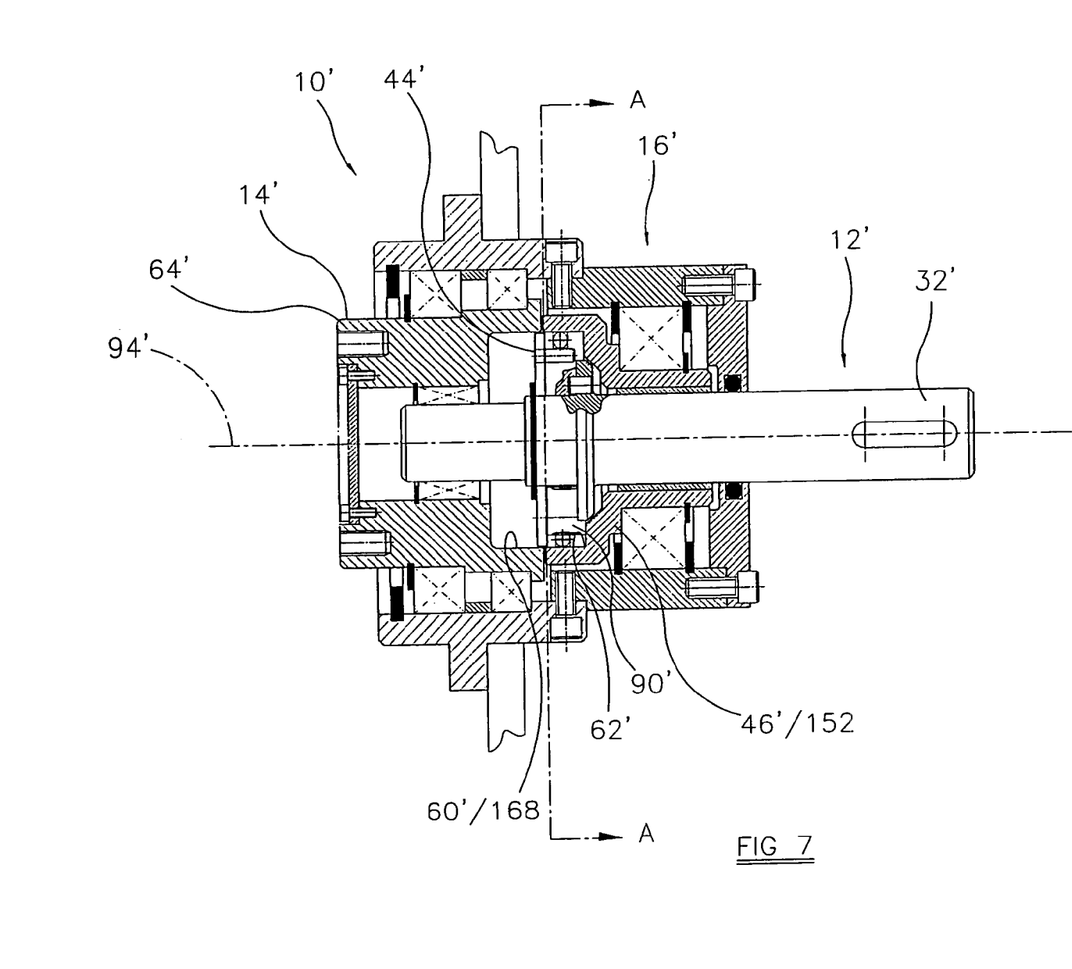
FIG. 7 is a view similar to FIG. 6 of the rotary coupling, but in a second condition.
Figure 8:
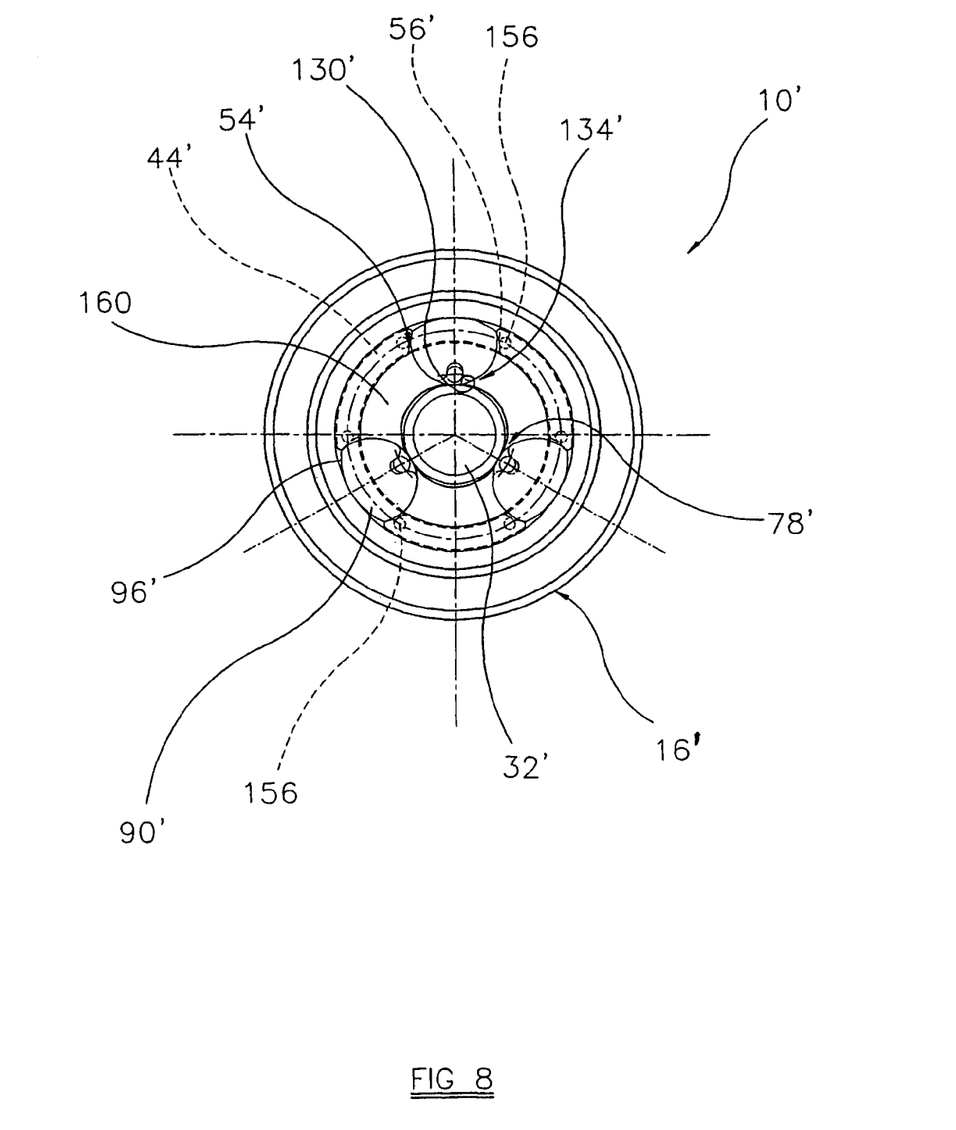
FIG. 8 is a transverse sectional view taken along the line A—A in FIG. 7.

Referring now to FIGS. 6 to 8, there is shown a rotary coupling 10' which is adapted for use as a direct-drive clutch. Like references refer to parts which are similar to the wheel-chair embodiment, and as such detailed description will be omitted.

The driving part 12' and the drivable part 14' are mounted to be rotatable coaxially within the fixed part 16'. The fixed part 16' is a two part housing 140 and 142, the driving part 12' being indirectly supported for rotation by a bearing 38' in the first housing 140, and the drivable part 14' being directly rotatably supported by spaced bearings 70' in the second housing 142. The first and second housings 140 and 142 are engaged using screw-threaded fasteners 144. The second housing 142 includes the fastening flange 18', and an end plate 146 closes the first housing 140 via suitable fastening means.

The driving shaft 32' of the driving part 12' is an axially displaceable solid input shaft which extends into the first housing 140, through an opening 148 in the end plate 146, coaxially with the drivable part 14' and the fixed part 16'. The driving shaft 32' is rotatably and slidably supported by a bearing 150 in the drivable part 14'. A gasket 40' is mounted in the opening of the end plate 146, and provides a fluid-tight seal around the outer circumference of the driving shaft 32'.

The annular contact member 46' of the driving part 12' is, in this embodiment, formed as part of a sleeve 152 which is supported by, and free to rotate on, the driving shaft 32'. The sleeve 152 is sandwiched between the bearing 38' of the first housing 140 and the driving shaft 32'.

The carrier 44' is in the form of an annular retaining ring, held in position by a retaining clip 154 engaged with the driving shaft 32'. The carrier 44' is fixed relative to, and coaxial with, the driving shaft 32' and lies radially inside the secondary annular contact surface 62' of the annular contact member 46'. The carrier 44' includes a plurality of elongate pin members 156, each of which projects towards the end plate 146 of the first housing 140 in parallel with the rotational axis 94' of the rotary coupling 10'. The pin members 156 define the coupling member seatings 54' and thrust surfaces 56' (see FIG. 8).

In this embodiment, the collar 76 is dispensed with, and the coupling member recesses 78' are formed circumferentially on the driving shaft 32'. The driving shaft 32' also includes an integral shoulder portion 160 so that, in conjunction with the carrier 44', the axial movement of the coupling members 90', relative to the driving shaft 32', is limited.

The drivable part 14' comprises the drivable shaft 64', or output shaft, having the projecting portion 66' for connection to the remaining part of a transmission (not shown). The drivable shaft 64' has a stepped outer surface 162. Axial displacement of the drivable shaft 64' is prevented, or limited, by the arrangement of the bearings 70' with the stepped outer surface 162 and a retaining clips 164.

The drivable shaft 64' has a stepped cylindrical throughbore 166, thereby allowing the driving shaft 32' to be coaxially supported therein. The larger diameter portion 168 of the stepped bore 166 defines the primary annular contact surface 60' which is of equal, or substantially equal, diameter to the secondary annular contact surface 62'.

The sleeve 152 of the driving part 12' is positioned to be in close proximity to the drivable shaft 64', so that the primary and secondary annular contact surfaces 60' and 62' are directly adjacent to each other, similarly to the first embodiment.

As in the first embodiment, the driving and drivable parts 12' and 14' are coupled together by means of the coupling members 90'.

Referring to FIG. 6, when it is required that the clutch outputs a drive torque, the driven driving shaft 32' is axially slid, via a suitable axial displacement mechanism (not shown), to the first position where the coupling members 90' are juxtaposed the primary annular contact surface 60' of the drivable shaft 64'.

A driving torque transmitted by the driving shaft 32' to the coupling members 90', through the concave recesses 78', causes the coupling members 90' to move along the base and cam-form surface portions 130' and 134' of the concave recesses 78' and to ride up the pin members 156 towards the primary annular contact surface 60', similarly to the application of a net reverse torque in the first embodiment. The wedging surfaces 96' of the coupling members 90', therefore, progressively engage the primary annular contact surface 60' of the drivable shaft 64', and the driving torque is transmitted to the drivable part 14'.

Referring to FIG. 7, when it is required that the clutch is disengaged, i.e. when no output drive is required, the driving shaft 32' is axially slid to the second position where the coupling members 90' are juxtaposed to the secondary annular contact surface 62' of the sleeve 152. Any input torque through the driving shaft 32' now causes the wedging surfaces 96' of the coupling members 90' to progressively lock against the secondary annular contact surface 62', resulting in the sleeve 152 simply rotating with the driving shaft 32' and the drivable part 14' being in a free-wheel state.

It will be noted that, in the second embodiment, the braking surface of the fixed part is dispensed with. Furthermore, the driving shaft and the drivable shaft of the first embodiment are in permanent torque transmitting engagement, whereas the driving shaft and the drivable shaft of the second embodiment are torque transmissibly disengaged in the second position.

The rotary coupling is not limited to being applied to a wheelchair or clutch, and it could easily be adapted for use in numerous other applications. For example, the rotary coupling of the first embodiment is particularly suitable for use in a stairlift. The inclusion of the reduction gearbox, instead of the worm-drive gearbox, significantly improves efficiency and decreases battery power consumption by the motor.

It is thus possible to provide a rotary coupling that, in a first condition, can prevent the transmission of a net reverse torque from the drivable side to the driving side and, in a second condition, allows free rotation in any direction on the application of a net torque to the drivable side. It is also possible to provide a rotary coupling that permits the use of a reduction gearbox, instead of a worm-drive gearbox, while still preventing the possibility of back-drive. It is further possible to provide a rotary coupling that can be used as a direct-drive clutch, dispensing with the need for friction plates.

The embodiments described above are given by way of examples only, and other modifications will be apparent to persons skilled in the art without departing from the scope of the invention as defined by the appended claims. For example, it may be possible to carry the coupling members on the drivable part instead of on the driving part; and the coupling members could be moved between the first condition and the second condition in a manner other than by displacement in the direction of the rotational axis of the rotary coupling.

What is claimed is:

1. A rotary coupling comprising:
   a driving part;
   a drivable part;
   a fixed part in which the driving and drivable parts are each rotatable coaxially; and
   a set of coupling members carried by one of the driving and drivable parts for torque-transmitting engagement with the other,
   wherein the coupling members are selectively positionably arranged so that, in a first condition, the coupling members are juxtaposed to a primary annular contact surface of one of the fixed part and the drivable part and, in a second condition, the coupling members are juxtaposed to a secondary annular contact surface of the driving part;

wherein each coupling member is free to move relative to the driving and drivable parts into and out of engagement with the primary and secondary annular contact surfaces;

wherein said arrangement is such that, when the coupling members are in said first condition, application of a first torque on the coupling members causes the coupling members to engage the primary annular contact surface and, when the coupling members are in the second condition, application of a second torque on the coupling members causes the coupling members to engage the secondary annular contact surface; and wherein each coupling member is a truncated cylinder, the major part of which is cylindrical with a cylinder axis parallel to a rotational axis of the coupling, the truncated cylinder being truncated parallel to said cylinder axis to define a wedging surface which faces the adjacent primary and secondary annular contact surfaces, when the coupling members are in the first and second conditions, respectively.

2. A rotary coupling as claimed in claim 1, wherein the coupling members are moved between the first and second conditions by displacement in a direction of a rotational axis of the rotary coupling.

3. A rotary coupling as claimed in claim 1, wherein the coupling members are free to move independently of each other.

4. A rotary coupling as claimed in claim 1, wherein the primary annular contact surface is a braking surface of the fixed part and the coupling members are carried by the drivable part so that, when the coupling members are in the first condition, a driving torque applied by the driving part to the coupling members is transmitted by the coupling members to the drivable part without engagement of the coupling members with the braking surface, but the said first torque, being a net reverse torque, applied by the drivable part to the coupling members, tends to move the coupling members into wedging engagement with the braking surface so as to lock up the coupling; and, when the coupling members are in the second condition, the said second torque, being the said reverse torque, does not cause the coupling to lock up.

5. A rotary coupling as claimed in claim 4, wherein, when the coupling members are in the second condition, the drivable part is in a free-wheel state.

6. A rotary coupling as claimed in claim 4, wherein the set of coupling members is moved between the first and second conditions by a push-rod element coaxial with the driving and drivable parts.

7. A rotary coupling as claimed in claim 6, wherein the push-rod element is manually operable by a lever.

8. A rotary coupling as claimed in claim 4, wherein the driving part is torque disengageably coupled to a reduction gearbox.

9. A rotary coupling as claimed in claim 8, wherein the reduction gearbox is driven by a battery-operated motor.

10. A rotary coupling as claimed in claim 8, wherein, when the coupling members are in the second condition, the driving part is torque disengaged from the reduction gearbox.

11. A rotary coupling as claimed in claim 4, wherein the driving part includes a carrier coaxial with the driven part, the carrier having a plurality of elongate seatings which limits relative circumferential displacement of the coupling members while allowing the coupling members to freely move in a radial plane and to move axially between the first and second conditions.

12. A rotary coupling as claimed in claim 4, wherein each coupling member has an opening, and the drivable part has a pin element which is received in the said opening, the pin element, on application of the said reverse torque to the rotary coupling, aiding movement of the coupling member, when in the first condition, into progressive wedging engagement with the braking surface of the fixed part and, when in the second condition, into progressive wedging engagement with the secondary annular contact surface of the driving part.

13. A rotary coupling as claimed in claim 1, wherein the primary annular contact surface is part of the drivable part and the coupling members are carried by the driving part so that, when the coupling members are in the first condition, the said first torque, being a driving torque, applied by the driving part to the coupling members tends to move the coupling members into wedging engagement with the primary annular contact surface whereby the driving part and the drivable part are in torque transmitting engagement; and, when the coupling members are in the second condition, the driving part and the drivable part are torque transmittingly disengaged.

14. A rotary coupling as claimed in claim 13, wherein, when the coupling members are in the second condition, the drivable part is in a free-wheel state.

15. A rotary coupling as claimed in claim 13, wherein the driving part includes a driving shaft on which the coupling members are carried, and the coupling members are moved between the first and second conditions by axial displacement of the driving shaft.

16. A rotary coupling as claimed in claim 13, wherein the driving part includes a freely-rotatable sleeve, and the secondary annular contact surface is formed on an interior surface of the sleeve so that, when the coupling members are in the second condition, the said second torque, being the said driving torque, applied by the driving part to the coupling members, tends to move the coupling members into progressive wedging engagement with the secondary annular contact surface.

17. A rotary coupling as claimed in claim 13, wherein each coupling member has an opening, and the driving part has a pin element which is received in the said opening, the pin element, on application of the said reverse torque to the rotary coupling, aiding movement of the coupling member into progressive wedging engagement with the primary and secondary annular contact surfaces.

18. A rotary coupling comprising:

a driving part;

a drivable part;

a fixed part in which the driving and drivable parts are each rotatable coaxially; and a set of coupling members carried by one of the driving and drivable parts for torque-transmitting engagement with the other, wherein the coupling members are selectively positionably arranged so that, in a first condition, the coupling members are juxtaposed to a primary annular contact surface of one of the fixed part and the drivable part and, in a second condition, the coupling members are juxtaposed to a secondary annular contact surface of the driving part;

wherein each coupling member is free to move relative to the driving and drivable parts into and out of engagement with the primary and secondary annular contact surfaces;

wherein said arrangement is such that, when the coupling members are in said first condition, application of a first torque on the coupling members causes the coupling members to engage the primary annular contact surface and, when the coupling members are in the second condition, application of a second torque on the coupling members causes the coupling members to engage the secondary annular contact surface;

wherein the primary annular contact surface is a braking surface of the fixed part and the coupling members are carried by the drivable part so that, when the coupling members are in the first condition, a driving torque applied by the driving part to the coupling members is transmitted by the coupling members to the drivable part without engagement of the coupling members with the braking surface, but the said first torque, being a net reverse torque, applied by the drivable part to the coupling members, tends to move the coupling members into wedging engagement with the braking surface so as to lock up the coupling; and, when the coupling members are in the second condition, the said second torque, being the said reverse torque, does not cause the coupling to lock up; and wherein each coupling member has an opening, and the drivable part has a pin element which is received in the said opening, the pin element, on application of the said reverse torque to the rotary coupling, aiding movement of the coupling member, when in the first condition, into progressive wedging engagement with the braking surface of the fixed part and, when in the second condition, into progressive wedging engagement with the secondary annular contact surface of the driving part.

19. A rotary coupling comprising:
a driving part;
a drivable part;
a fixed part in which the driving and drivable parts are each rotatable coaxially; and
a set of coupling members carried by one of the driving and drivable parts for torque-transmitting engagement with the other, wherein the coupling members are selectively positionably arranged so that, in a first condition, the coupling members are juxtaposed to a primary annular contact surface of one of the fixed part and the drivable part and, in a second condition, the coupling members are juxtaposed to a secondary annular contact surface of the driving part;

wherein each coupling member is free to move relative to the driving and drivable parts into and out of engagement with the primary and secondary annular contact surfaces;

wherein said arrangement is such that, when the coupling members are in said first condition, application of a first torque on the coupling members causes the coupling members to engage the primary annular contact surface and, when the coupling members are in the second condition, application of a second torque on the coupling members causes the coupling members to engage the secondary annular contact surface;

wherein the primary annular contact surface is part of the drivable part and the coupling members are carried by the driving part so that, when the coupling members are in the first condition, the said first torque, being a driving torque, applied by the driving part to the coupling members tends to move the coupling members into wedging engagement with the primary annular contact surface whereby the driving part and the drivable part are in torque transmitting engagement; and, when the coupling members are in the second condition, the driving part and the drivable part are torque transmittingly disengaged; and wherein each coupling member has an opening, and the driving part has a pin element which is received in the said opening, the pin element, on application of the said reverse torque to the rotary coupling, aiding movement of the coupling member into progressive wedging engagement with the primary and secondary annular contact surfaces.

* * * * *